United States Patent
Harris

(10) Patent No.: US 7,467,403 B2
(45) Date of Patent: Dec. 16, 2008

(54) TECHNIQUES FOR ENTRY OF LESS-THAN-PERFECT-PASSWORDS

(76) Inventor: Scott C. Harris, P.O. Box 927649, San Diego, CA (US) 92192

(*) Notice: Subject to any disclaimer, the term of this patent is extended or adjusted under 35 U.S.C. 154(b) by 776 days.

(21) Appl. No.: 11/033,012

(22) Filed: Jan. 10, 2005

(65) Prior Publication Data
US 2005/0154926 A1    Jul. 14, 2005

Related U.S. Application Data

(60) Provisional application No. 60/535,204, filed on Jan. 9, 2004.

(51) Int. Cl.
G06F 21/00 (2006.01)
H04L 9/32 (2006.01)

(52) U.S. Cl. .................. 726/6; 726/7; 726/18; 726/19
(58) Field of Classification Search ............ 726/6, 726/18
See application file for complete search history.

(56) References Cited

U.S. PATENT DOCUMENTS

| | | | | |
|---|---|---|---|---|
| 4,138,719 A * | 2/1979 | Swanstrom et al. | ...... | 358/1.18 |
| 4,926,491 A * | 5/1990 | Maeda et al. | ...... | 382/155 |
| 5,394,471 A * | 2/1995 | Ganesan et al. | ...... | 713/183 |
| 5,430,827 A * | 7/1995 | Rissanen | ...... | 704/272 |
| 6,026,491 A * | 2/2000 | Hiles | ...... | 726/18 |
| 6,094,632 A * | 7/2000 | Hattori | ...... | 704/239 |
| 6,263,447 B1 * | 7/2001 | French et al. | ...... | 726/5 |
| 6,282,658 B2 * | 8/2001 | French et al. | ...... | 726/7 |
| 6,321,339 B1 * | 11/2001 | French et al. | ...... | 726/2 |
| 6,560,352 B2 * | 5/2003 | Rowe et al. | ...... | 382/115 |
| 6,857,073 B2 * | 2/2005 | French et al. | ...... | 713/168 |
| 7,234,156 B2 * | 6/2007 | French et al. | ...... | 726/2 |

FOREIGN PATENT DOCUMENTS

EP    0856836 A2 *  8/1998
WO   WO 02/084605   * 10/2002

* cited by examiner

*Primary Examiner*—Christopher A Revak

(57) ABSTRACT

A technique of allowing entry of the password which is not 100% correct. This password would be used to verify identity and/or login information in low security techniques. The password is scored relative to the correct password. The scoring can take into effect least mean squares differences, and other information such as letter groups, thereby detecting missed characters or extra characters, as well as shift on the keyboard.

13 Claims, 2 Drawing Sheets

TECHNIQUES FOR ENTRY OF LESS-THAN-PERFECT-PASSWORDS

CROSS RELATED APPLICATIONS

This application claims priority to U.S. Provisional Application No. 60/535,204 filed Jan. 9, 2004.

BACKGROUND

Passwords are used as a form of personal identification to allow a user access to a specified resource.

Security can be balanced against the inconvenience to a user for accessing that security. For example, it may be inconvenient for a user to enter long or difficult passwords. The need to enter a difficult password is inconvenient to the user. However, the user may accept that difficulty, because of the need to maintain the security of a transaction or database.

Passwords can secure access to specified resources. The resource can be, for example, a local computer system, or a web site or membership site which requires access, or even physical access to a premises. Sometimes, however, less security may be needed. For example, certain web sites require login, but only allow a user access to less personal and/or secure information. For example, a web site may require login to receive news or other personalization information. Also, sometimes log in to a web site may be dependent on the actual computer that is being logged in, in which case it is unlikely that an unauthorized user is actually logging in.

Other situations where the odds of unauthorized entry are low include a web site where a timeout has occurred after certain amounts of time. In all of these situations, it may be desirable to accept lower security.

Passwords, as described herein, may take different forms, and may include, for example, an alphanumeric password, a personal identification number or "pin", or specified sequences of other types.

SUMMARY

The present application teaches acceptance of a password which is less than perfect, so long as the difference between the entered password and the actual password meets certain criteria.

According to one aspect, the entered password is correlated against the correct password, using image correlation techniques, and a least means squares difference is obtained. So long as the least means squares difference is less than a specified amount, access to the resource is granted.

According to another aspect, a determination is made up how many letters are incorrect, and patterns of incorrect letters. For example, a position on the keyboard is determined, or an extra letter, or a missing letter.

BRIEF DESCRIPTION OF THE DRAWINGS

These and other aspects will now be described in detail with reference to the accompanying drawings, wherein.

DETAILED DESCRIPTION

Figure 1:
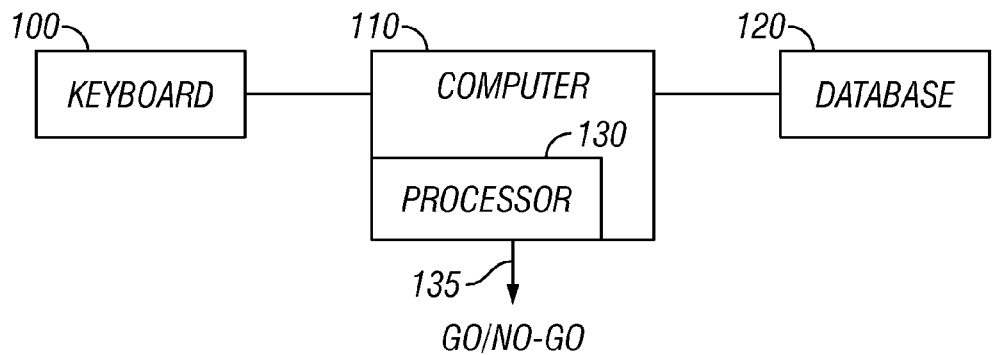
FIG. 1 shows a basic block diagram of the system.

The basic system is shown in FIG. 1. A user interface 100, such as a keyboard, is connected to a general or specific purpose computer 110. The computer can be, for example, a special access device which is configured only to allow access to a specified resource. For example, the computer can be a specific purpose entry granting device. The computer is also connected to a database 120 which stores information indicative of correct password(s). The computer includes a processing part 130 that processes the password entered on the keyboard against the password entered in the database to produce a go/no go indication shown as 135. This go/no go indication may be part of a signal that controls the access to the resource.

Figure 2:
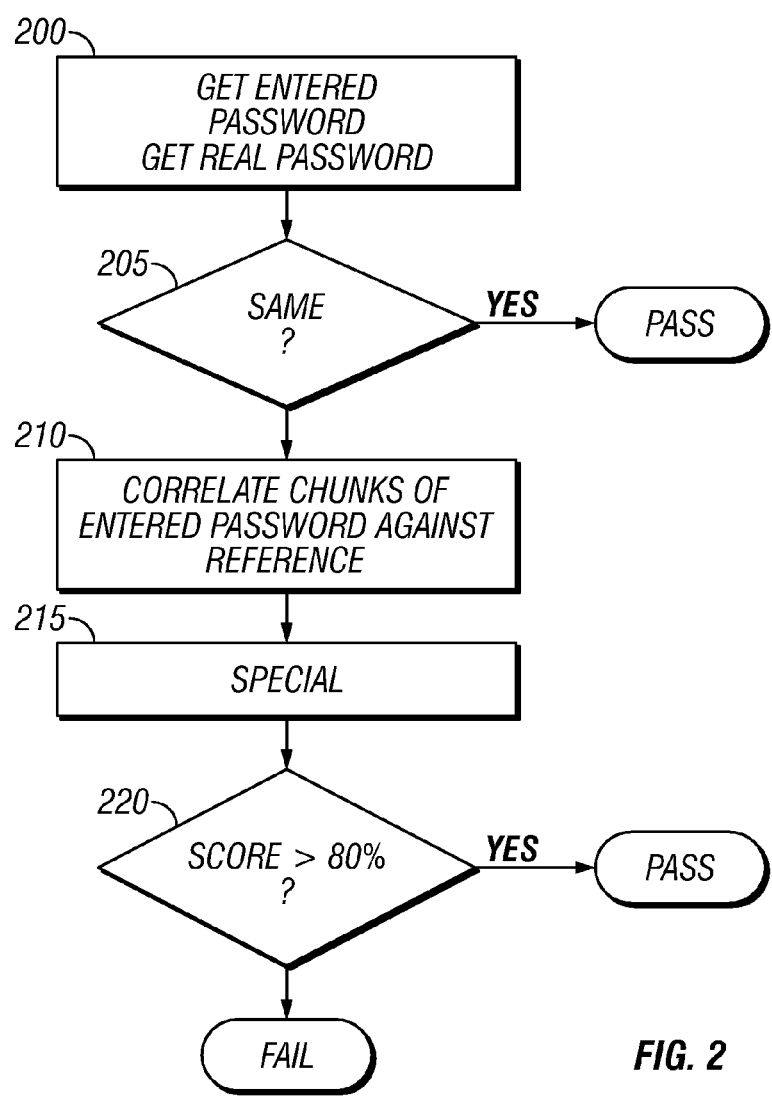
FIG. 2 shows a flowchart of password acceptance for the system.

The computer processor operates according to the specific flowchart shown in FIG. 2. At 200, the computer gets the entered password and actual password. 205 determines if the passwords are identical, and if so signals a pass. However, if the passwords are not identical, then 210 uses image correlation techniques to correlate chunks of the entered password against the reference password. That is, even though the entered password is text, it is treated as being different blocks of sequences, and the pattern of those sequences is compared against the pattern of sequences in the actual password. This technique is analogous to the way that an image is processed. For example, letters and locations may be correlated against each other, followed by neighborhoods, 2 letter groups, 3 letter groups and the like.

Figure 3:
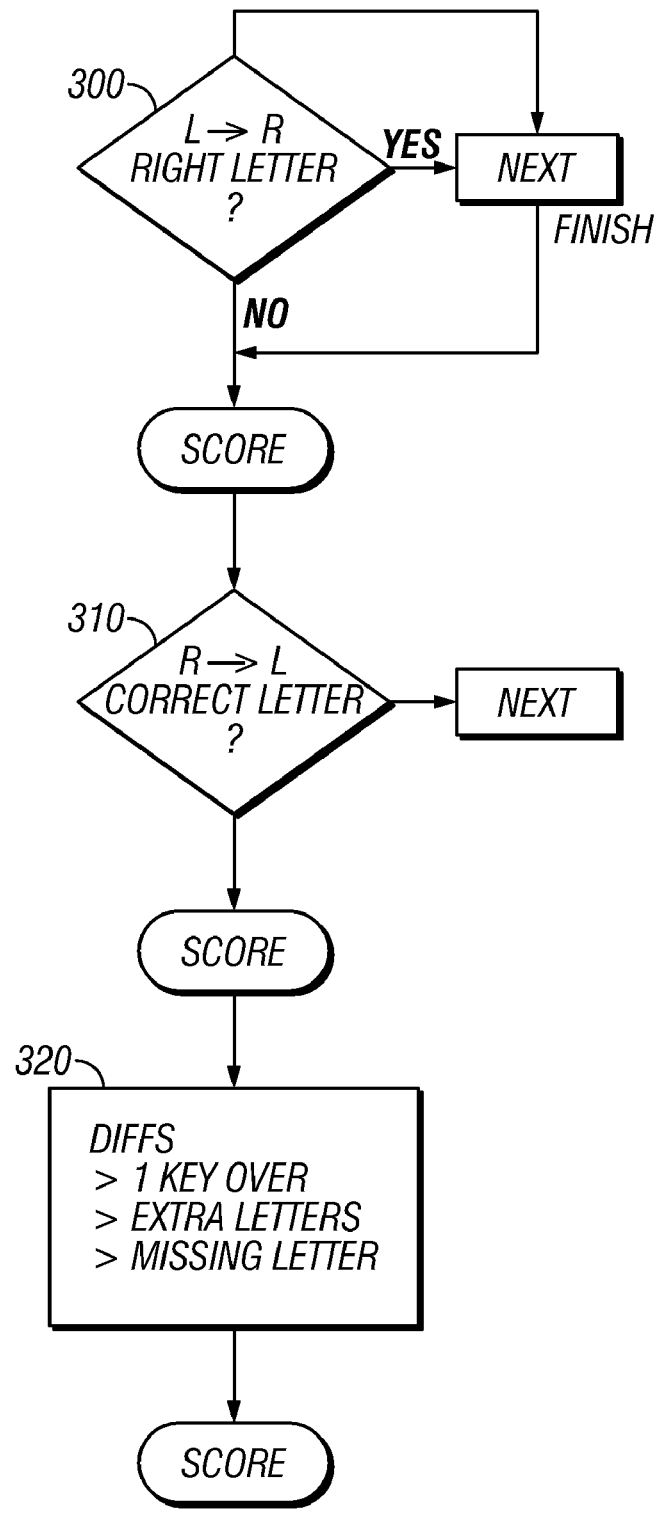
FIG. 3 shows a flowchart of scanning the password to determine correlation with the correct password.

The correlation may be used to determine a least mean squares distance between the entered password and the reference password. Many different ways of finding the least mean squares difference are known, and any of these techniques may be used. However, a specific technique is described herein with reference to FIG. 3. Special processing techniques are carried out at 215, a special processing technique being techniques which are specific to the entry of data via a keyboard. This produces a score which is output. The score is compared with a specified value, here 80%. If the score is higher than 80%, then access to the resource is granted. If the score is lower than 80%, then access to the resource is denied. A specific technique of correlating is shown in FIG. 3. Note that this correlation need only be carried out if exact matches between the passwords are not found.

FIG. 3 shows a system which correlates along the letter from left to right (300) then right to left (310). This determines the number of exact matches between letters both at the beginning and end of the word. At 320, the differences between the letters are analyzed. These differences may include whether the letter that was entered was shifted on the keyboard relative to where it should be, whether there was an extra letter, or whether there was a missing letter. These most common errors are accommodated in this way. Each of the different errors is associated with a score, and the overall score is used as the output value.

Other modifications are possible. For example, while least mean squares has been described, it should be understood that any technique which can be used to analyze patterns of sequences, and more specifically, any technique which has been used to analyze/identify images or portions of images, can be used in this system. This system uses a "good enough" measure to determine whether the password that is entered sufficiently closely matches the stored password, in a way which provides reasonable, but not perfect certainty that the user has entered the correct password. Other embodiments are contemplated, and the disclosure is intended to encompass all embodiments and modifications which might be predictable based on the disclosed subject matter. Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
obtaining a password which has been entered, as an entered password;
comparing said entered password with a stored password; and
signaling acceptance of the entered password based on said comparing, even when the entered password is not exactly the same as the stored password, wherein said signaling acceptance comprises determining a score indicating a relationship between said entered password and said stored password and where the score is based on correlating digits in the entered password with digits in the stored password, and the score is also based on correlating locations of those digits in the entered password with the location of those digits in the stored password, and said signaling acceptance comprises determining if the score is greater than a predetermined amount and signaling the acceptance only when the score is greater than the predetermined amount.

2. A method as in claim 1, wherein said signaling acceptance comprises allowing access to a specified resource when the entered password is not exactly the same as the stored password.

3. A method as in claim 1, wherein said score takes into account an analysis of common keyboarding errors.

4. A method as in claim 1, wherein said comparing comprises determining a least mean squares difference between the entered password and the stored password, and determining acceptance from an amount of said least mean squares difference.

5. A method as in claim 1, wherein said comparing comprises comparing using image correlation techniques.

6. A method, comprising:
obtaining a password which has been entered, as an entered password;
comparing said entered password with a stored password; and
signaling acceptance of the entered password based on said comparing, even when the entered password is not exactly the same as the stored password, wherein said comparing comprises looking for groups of characters that are common in both of said stored password and said entered password.

7. A system, comprising:
a computer, which stores at least one stored password, and compares said at least one password to an entered password, which determines differences between said stored password and said entered password, and accepts the entered password based on said differences, even when the entered password is not exactly the same as said stored password, wherein said computer determines a score related to a difference between said stored password and said entered password, wherein said score is related to an absolute distance between information in said entered password and information in said stored password.

8. A system as in claim 7, wherein said score defines a least mean squares distance between said entered password and said stored password.

9. A system as in claim 7, wherein said password is accepted when said score is greater than a specified amount, which specified amount is less than 100%.

10. A system, comprising:
a computer, which stores at least one stored password, and compares said at least one password to an entered password, which determines differences between said stored password and said entered password, and accepts the entered password based on said differences, even when the entered password is not exactly the same as said stored password, wherein said computer determines distances on a keyboard for differences between said entered password and said stored password, and uses said distances to determine if the entered password should be accepted when not exactly the same as the stored password.

11. A system as in claim 10, wherein said computer determines a score related to a difference between said stored password and said entered password.

12. A computer readable storage medium containing a set of instructions for a general-purpose computer, the set of instructions comprising:
instructions to obtain a password which has been entered;
instructions to access a database of stored passwords;
instructions to compare the entered password with at least one password in the database;
instructions to determine a score representing similarities between the entered password and the stored password; and
instructions to accept the entered password based on said score even when the entered password is not exactly the same as the stored password, wherein said score defines a least mean squares distance between parts of said entered password and parts of said stored password.

13. A medium as in claim 12, wherein said determine a score determines whether a difference between the entered password and the stored password includes a plurality of letter groups which are the same to determine extra characters or missing characters.

* * * * *